United States Patent [19]

Martenas

[11] 4,313,294
[45] Feb. 2, 1982

[54] CONSTANT FLOAT ATTACHMENT APPARATUS

[75] Inventor: Wayne B. Martenas, New Holland, Pa.

[73] Assignee: Sperry Corporation, New Holland, Pa.

[21] Appl. No.: 186,353

[22] Filed: Sep. 11, 1980

[51] Int. Cl.³ .................... A01D 35/12; A01D 67/00
[52] U.S. Cl. ........................... 56/15.8; 56/208; 56/DIG. 9; 56/DIG. 10
[58] Field of Search ............ 56/15.8, 15.9, 16.1, 56/16.2, 16.3, 208, DIG. 10, DIG. 11, DIG. 9

[56] References Cited

U.S. PATENT DOCUMENTS

| Re. 30,056 | 7/1979 | Halls | 56/208 |
| 3,355,865 | 12/1967 | Waldrop | 56/208 |
| 3,728,851 | 4/1973 | Antwerp | 56/208 |
| 4,099,368 | 7/1978 | Mackert et al. | 56/208 |

FOREIGN PATENT DOCUMENTS 873947  8/1961  United Kingdom ................. 56/208

Primary Examiner—Robert A. Hafer
Attorney, Agent, or Firm—James R. Bell; Frank A. Seemar

[57] ABSTRACT

Most presently known crop harvesting attachment flotation apparatus use a spring to preload the attachment into a floating mode. A problem with this is that, as the attachment is either forced upwardly or intentionally raised, the effectiveness of the spring decreases. This is avoided by a combination of a spring and a fluid operated cylinder acting through pivotal linkage relationships for retaining the attachment in a substantially constant flotation mode during lifting operations and during flotation operations.

6 Claims, 5 Drawing Figures

CONSTANT FLOAT ATTACHMENT APPARATUS

BACKGROUND OF THE INVENTION

This invention relates generally to forage harvesters and more particularly to those including a floating attachment.

Crop harvesting attachments are removably connected to harvesting machines such as forage harvesters. It is desirable to have the attachment "float" along the ground surface. This is accomplished by tensioning a spring or springs to a desired preload so that most of the weight of the attachment is suspended and only a fraction of the actual weight of the attachment rests on the ground. Thus, the effective ground engaging weight of the attachment is minimized. One of the reasons this is advantageous is because the ground surface is uneven and impact loads are forced on the attachment. Such impact loads could cause structural damage if the impact encountered the full weight of the attachment. However, since the impact encounters only a fraction of the actual weight of the attachment, damage is minimized. Another reason this is advantageous is because it is quite obviously easier to move the attachment along the ground when its effective ground engaging weight has been minimized.

A limitation of known attachment flotation is that the amount of flotation preload decreases rapidly as the attachment is either forced upwardly or is raised mechanically. This limitation occurs because the spring is usually relaxed as the attachment moves upwardly. The situation is compounded since the torque about the attachment pivot point is increased due to the attachment CG moving away from the pivot point. As a result, when the attachment is only a few inches above the ground surface, its effective ground engaging weight is significantly increased.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a substantially constant float attachment apparatus including a lift arm pivotally connected to pivot the lift arm. A pivot arm is operably connected, at one end, to the lift arm and at another end to a resilient member attached to the machine. The pivot arm is movable into and out of engagement with a stop.

The pivotal linkage relationships of the foregoing elements connected in series provide a means for maintaining a substantially constant flotation on the attachment during lifting and flotation operations.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
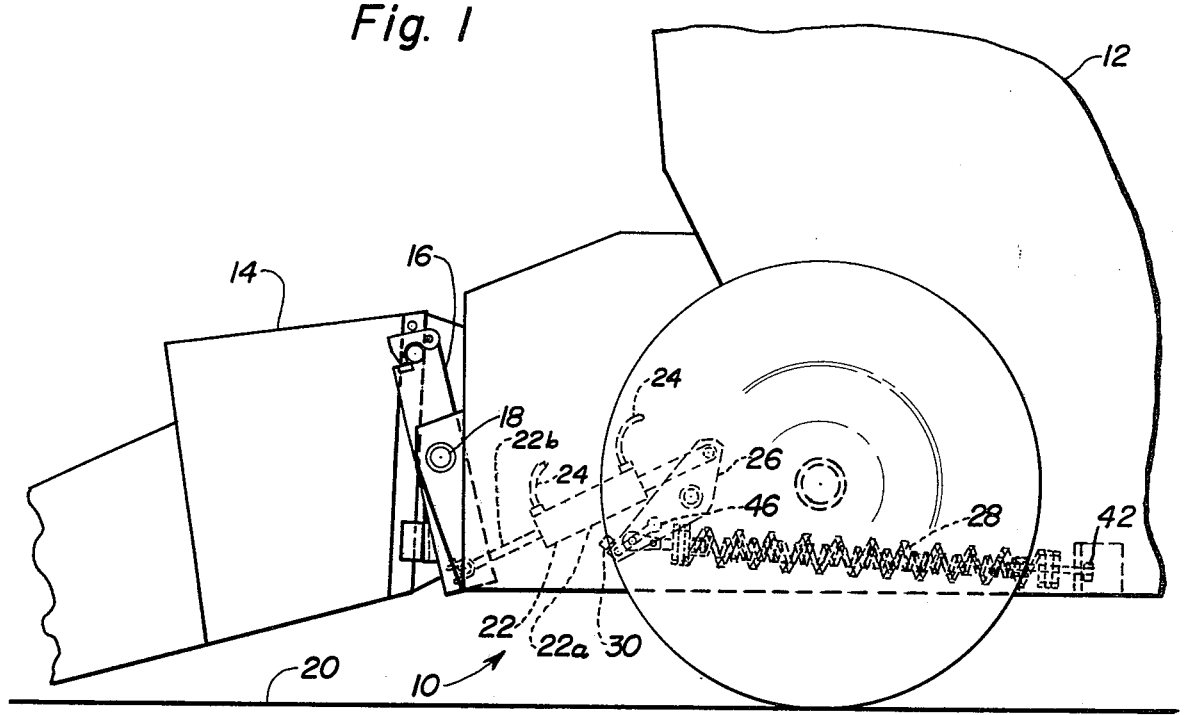
FIG. 1 is a partial side elevational view illustrating a crop harvesting machine, an associated attachment and the apparatus of this invention.

FIG. 1 illustrates the constant flotation attachment apparatus of this invention generally designated 10 and operably connected for use in combination with a crop harvesting machine 12 and an associated attachment 14.

As is well known, attachment 14 is mounted on machine 12 at a pair of lift arms 16, only one of which is shown and described. Such lift arms 16 are usually operable to be pivotally movable about a pivot point 18 for lifting attachment 14 relative to the ground surface 20. Such lifting is generally accomplished by a fluid operated member 22, preferably a hydraulic cylinder 22a having a relatively movable piston 22b. Member 22 is connected to a well known hydraulic system on machine via a pair of conduits 24. As it is known, by controlling fluid pressure in cylinder 22a, piston 22b may be moved relative to cylinder 22a or may be maintained in a stationary position so that cylinder 22a and piston 22b move as a unit without relative movement therebetween.

Elements of this invention include the lift arm 16, fluid operated member 22, a pivot arm 26, resilient members 28 and a stop 30. These elements are connected in series for forming a substantially constant flotation apparatus. A set of these elements is operably associated with each lift arm 16, however, only one set is shown and described. An advantage of having a set of these elements associated with each lift arm is that each set functions independently which allows one side of the attachment to be raised and lowered relative to the other side.

Lift arm 16 is of a generally known structure and function. Fluid operated member 22 is commercially available and is capable of handling a system pressure of about 2000 psi.

Figure 2:
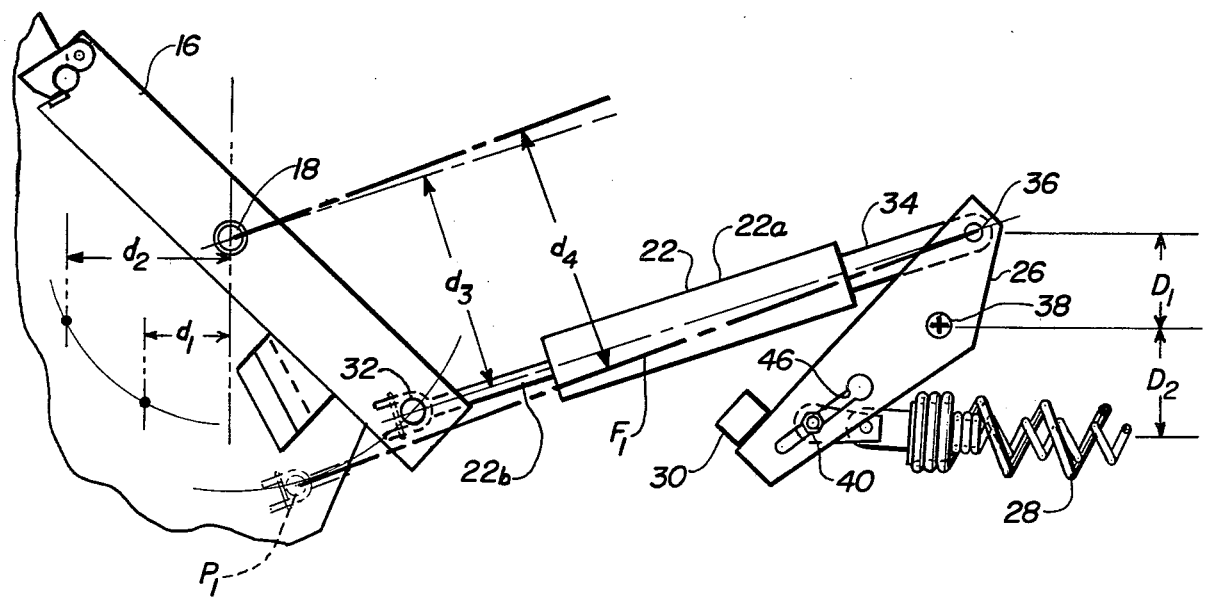
FIGS. 2, 3 and 4 are partial graphic views illustrating pivotal linkage relationships of the apparatus of this invention.

In FIG. 2, one end 32 of member 22 is connected to lift arm 16 for pivoting lift arm 16 about pivot point 18. Another end 34 of member 22 is connected to an end 36 of a pivot arm 26 connected to machine 12 for pivotal movement about a pivot point 38. Another end 40 of pivot arm 26 is connected to resilient members 28. Preferably, pivot arm 26 has a first distance $D_1$ between pivot point 38 and end 36. Pivot arm 26 has a second distance $D_2$ between pivot point 38 and end 40. Pivot arm 26 is preferably formed of steel suitable for use in the construction of farm machinery.

Fixed stop 30 is positioned on machine 12 for engagement with end 40 of pivot arm 26. Resilient members 28 are preferably a commercially available pair of concentric tension springs formed of a known suitable spring steel. It is preferred to use a pair of concentric springs to obtain the desired springload and spring rate in the available space, however, it is recognized that equivalent resilient members may be substituted. Springs 28 are adjustably connected to machine 12 at a bolt 42, FIGS. 1 and 4 for increasing spring tension thus obtaining the desired flotation. Preferably, with attachment 14 mounted on lift arm 16, springs 28 are tensioned so that attachment 14 has about a 100 pound effective ground engaging weight. Alternatively, more flexibility can be achieved by providing a slot 46 adjacent end 40 of pivot arm 26. Thus, springs 28 can be connected to pivot arm 26 at various positions. In this manner, the operating characteristics of the apparatus can be substantially maintained when accommodating attachments of various size and weight.

With the parts assembled as set forth above certain relationships are required to render apparatus 10 operable. Referring to FIG. 2, it can be seen that a moment arm $d_1$ is a distance between a vertical line through the CG of floating attachment 14 and a vertical line through pivot point 18. A moment arm $d_2$ is a distance between a vertical line through the CG of raised attachment 14. As a result, the torque $T_1$ about pivot point 18 is substantially increased to $T_2$ when attachment 14 is raised. Attachment 14 is raised intentionally when fluid pressure in member 22 moves piston 22b relative to cylinder 22a for pivoting arm 16 about pivot point 18. In this lifting mode, flotation remains substantially constant since pivot arm 26 is urged against stop 30 thus maintaining a constant first spring rate $K_1$ on springs 28. End 36 of pivot arm 26 is a fixed point permitting lift arm 16 and a line of force ($F_1$) through member 22 to move to a position $P_1$ wherein a moment arm $d_3$ is increased in length to a moment arm $d_4$. Thus, the following relationships evolve: $K_1$ reamins constant, $d_2$ is greater than $d_1$ thus $T_2$ is greater than $T_1$, and $d_4$ is greater than $d_3$. From the foregoing it can be seen that during the lifting mode, flotation remains substantially constant due to the relationship: $K_1d_3 \simeq T_1$; $K_1d_4 \simeq T_2$.

Attachment 14 is raised unintentionally during the flotation mode when abrupt ground engagement urges attachment 14 upward thus pivoting lift arm 16 so that the aforementioned relationships occur rendering $T_2$ greater than $T_1$ since $d_2$ is greater than $d_1$. Pressure in member 22 limits relative movement between piston 22b and cylinder 22a so that member 22 moves as a unit or a solid member.

Figure 3:
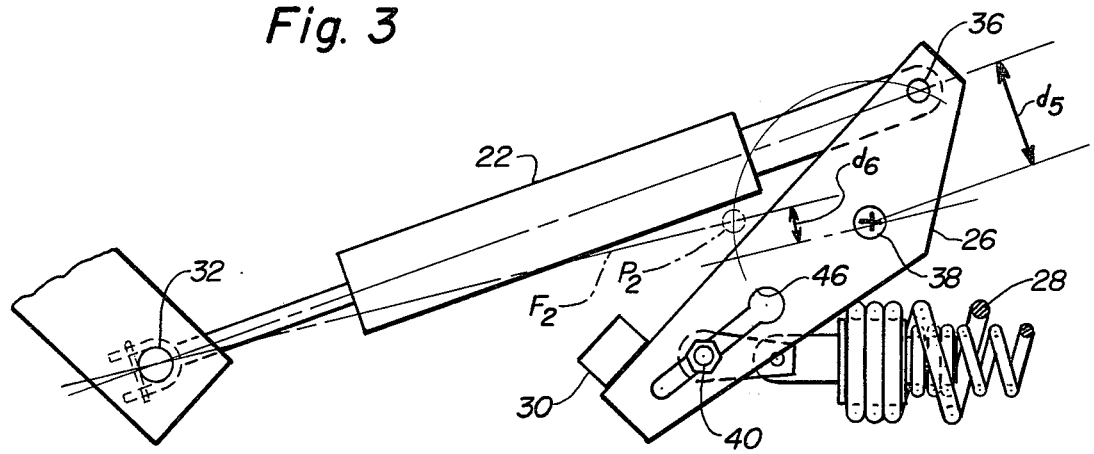
Figure 4:
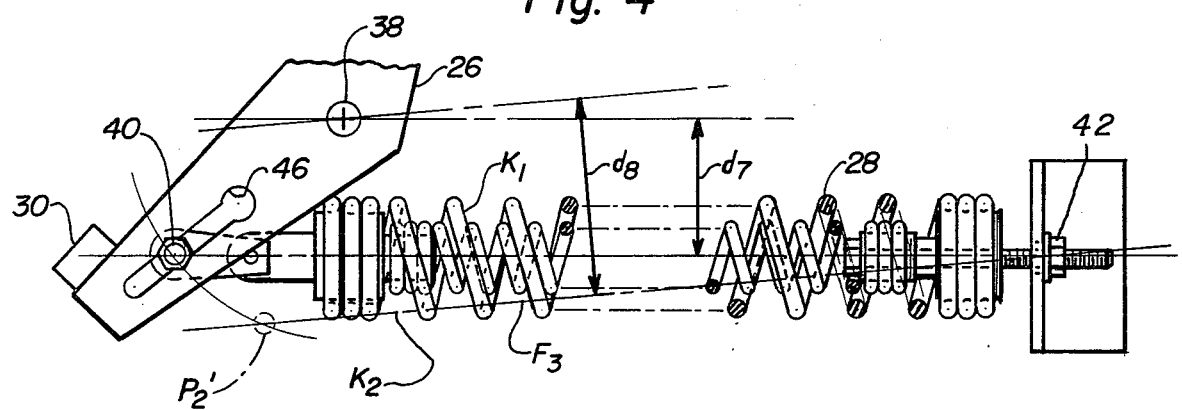

During the flotation mode, see FIGS. 3 and 4, a line of force $F_2$ through member 22 and end 36 of pivot arm 26 move to a position $P_2$. In position $P_2$ moment arm $d_6$ is decreased in length from a moment arm $d_5$ and a line of force $F_3$ through springs 28 and end 40 of pivot arm 26 move to position $P_2'$ as pivot arm 26 is pivoted away from stop 30. The length of springs 28 is reduced which effectively lessens tension in springs 28 and changes the spring rate to a reduced rate $K_2$. Also, in position $P_2'$ moment arm $d_7$ is increased in length to moment arm $d_8$. Thus, the following additional relationships evolve: $d_6$ is less than $d_5$, $d_8$ is greater than $d_7$ and, as stated, $K_2$ is less than $K_1$. From the foregoing it can be seen that during the flotation mode, flotation remains substantially constant due to the relationship:

$$\frac{K_1 d_7}{d_5} \times d_3 \simeq T_1$$

$$\frac{K_2 d_8}{d_6} \times d_4 \simeq T_2$$

Figure 5:
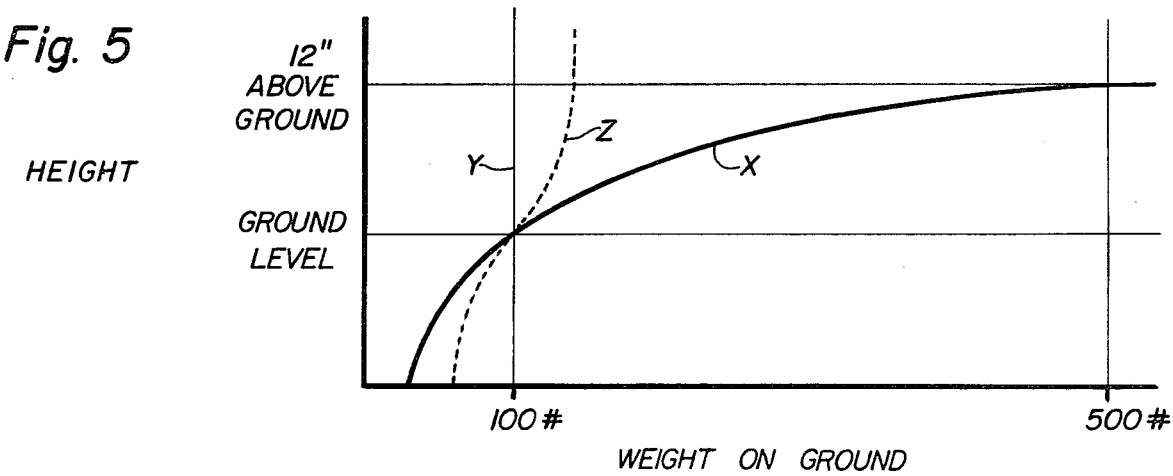
FIG. 5 is a graphic view illustrating advantages of the apparatus of this invention.

FIG. 5 graphically illustrates, as an example only, that when springs 28 are tensioned for flotation so that attachment 14 has an effective ground engaging weight of 100 pounds, prior art flotation devices might result in an attachment weight of about 500 pounds when attachment 14 is raised about 12 inches above ground level as illustrated by a theoretical curve X. Ideally, another theoretical curve y illustrates that a goal is to maintain the ground engaging weight absolutely constant regardless of height of the attachment above the ground. However, the apparatus 10 of this invention renders the effective ground engaging weight substantially constant as illustrated by still another theoretical curve Z when related to curves X and Y. The graph of FIG. 5 is intended to be exemplary only and is presented solely to illustrate that, within a set of selected parameters, theoretical curve Z falls somewhere between theoretical curves X and Y.

The foregoing has described an improved flotation apparatus for maintaining an attachment at a substantially constant effective ground engaging weight during lifting and flotation modes.

It is anticipated that aspects of the present invention, other than those specifically defined in the appended claims, can be obtained from the foregoing description and the drawings.

Having thus described the invention, what is claimed is:

1. Apparatus for lifting and floating attachments on a crop harvesting machine comprising:
   an attachment lift arm connected to a first pivot point on the machine;
   means connected for pivoting the life arm, said means including a fluid operated piston;
   resilient means connected for urging the lift arm into a float position;
   a pivot arm interconnecting the piston and the resilient means, the pivot arm having a first end connected to the piston and having a second end connected to the resilient means, the pivot arm connected to a second pivot point on the machine between the first and second ends of the pivot arm; and
   a stop on the machine for engagement with the second end of the pivot arm.

2. The apparatus of claim 1 wherein the resilient means is adjustably connected to the pivot arm.

3. The apparatus of claim 1 wherein the resilient means includes at least one coil spring tensioned between the machine and the second end of the pivot arm.

4. Apparatus for lifting and floating attachments on a crop harvesting machine comprising:
   means for lifting the attachments, the means being a lift arm connected to a first pivot point on the machine;
   a fluid operated cylinder and piston connected for pivoting the lift arm;
   a pivot arm having a first end connected to the fluid operated cylinder and piston and having a second end, the pivot arm being connected to a second pivot point on the machine between the first and second ends;
   at least one adjustable spring tensioned between the machine and the second end of the pivot arm, the spring connected for urging pivotal movement of the lift arm;
   the first end of the pivot arm being a first distance from the second pivot point; and
   the second end of the pivot arm being a second distance from the second pivot point greater than the first distance.

5. Apparatus for lifting and floating an attachment on a crop harvesting machine comprising:

a lift arm connected to the machine for pivoting about a first pivot point; and means for maintaining a substantially constant flotation on said attachment, the means including a fluid operated member operably connected to the machine and having one end pivotally connected to the lift arm, another end of the fluid operated member pivotally connected at a first end of a pivot arm, the pivot arm connected to the machine for pivoting about a second pivot point, the pivot arm operable for pivoting into and out of engagement with a stop connected to the machine, a resilient member connected between a second end of the pivot arm and the machine, said second pivot point being between said first and second ends of said pivot arm, the first end of said pivot arm being a first distance from the second pivot point and the second end of said pivot arm being a second distance from the second pivot point, the second distance being greater than the first distance.

6. Apparatus for lifting and floating an attachment on a crop harvesting machine comprising:

a lift arm pivotally connected to the machine at a first pivot point; and means for maintaining a substantially constant flotation on said attachment in response to said apparatus being in a lifting mode and in a flotation mode, the means including a fluid operated member operably connected to the machine and having one end connected for pivoting the lift arm, another end of the fluid operated member operably connected to the machine and having one end connected for pivoting the lift arm, another end of the fluid operated member connected to a first end of a pivot arm, the pivot arm connected to the machine at a second pivot point for pivoting into and out of engagement with a stop attached to the machine, and a resilient member adjustably tensioned between the machine and a second end of the pivot arm, the second pivot point being between the first and second ends of the pivot arm, the apparatus being of a construction sufficient for moving to a position in the lifting mode wherein the pivot arm is maintained in engagement with the stop in response to a piston moving relative to a cylinder of the fluid operated member for pivoting the life arm, the apparatus being of a construction sufficient for moving to a position in the flotation mode wherein the pivot arm moves out of engagement with the stop in response to the piston and cylinder of the fluid operating member moving as a unit.

* * * * *